United States Patent [19]

Godfrey

[11] Patent Number: 5,071,304

[45] Date of Patent: Dec. 10, 1991

[54] MULTI-BALE TRANSPORTING MACHINE FOR ROUND BALES

[76] Inventor: Vern L. Godfrey, Rte. 4, Warrensburg, Mo. 64039

[21] Appl. No.: 539,786

[22] Filed: Jun. 18, 1990

[51] Int. Cl.⁵ .......................... B60P 3/00; B65G 57/32
[52] U.S. Cl. .................................. 414/111; 414/24.5; 414/459
[58] Field of Search ...................... 414/24.5, 111, 459, 414/460

[56] References Cited

U.S. PATENT DOCUMENTS

| | | |
|---|---|---|
| 2,959,310 | 11/1960 | Meister, Jr. . |
| 3,019,926 | 2/1962 | Christenson . |
| 3,527,476 | 9/1970 | Winckler . |
| 3,747,788 | 7/1973 | Petetin . |
| 4,204,789 | 5/1980 | Parks, Jr. . |
| 4,204,790 | 5/1980 | Baxter . |
| 4,227,844 | 10/1980 | Love . |
| 4,286,915 | 9/1981 | LaBerdia . |
| 4,761,108 | 8/1988 | Kress et al. .......................... 414/460 |
| 4,773,806 | 9/1988 | Beaulieu ............................. 414/24.5 |

FOREIGN PATENT DOCUMENTS

| | | |
|---|---|---|
| 1086688 | 9/1980 | Canada . |
| 2496397 | 6/1982 | France ................................ 414/111 |
| 2026429 | 2/1980 | United Kingdom . |

Primary Examiner—Robert J. Spar
Assistant Examiner—Janice Krizek
Attorney, Agent, or Firm—Hovey, Williams, Timmons & Collins

[57] ABSTRACT

A self-loading machine capable of transporting several round bales at a time has an overhead frame from which a pair of transversely spaced clamping jaws are suspended. The two jaws are elongated fore-and-aft and outwardly bowed so as to present a generally cylindrical container that is open at its front and rear ends. The machine is towed behind a tractor or other vehicle but can be hydraulically shifted to an offset position relative to the line of draft of the vehicle during pickup and discharge operations. When a bale is to be picked up, the machine is advanced with the jaws spread wide apart until the machine is disposed over the bale straddling the latter. By hydraulically lowering the machine into a pickup position, the jaws are then disposed to be closed together, causing long beams at the bottom of the jaws to be forced transversely under the bale and within the grip of the container. The machine is then elevated to raise the bale off the ground for transport to the next bale, whereupon the sequence is repeated until the container is full of a line of bales to be transported over-the road or to another location.

4 Claims, 4 Drawing Sheets

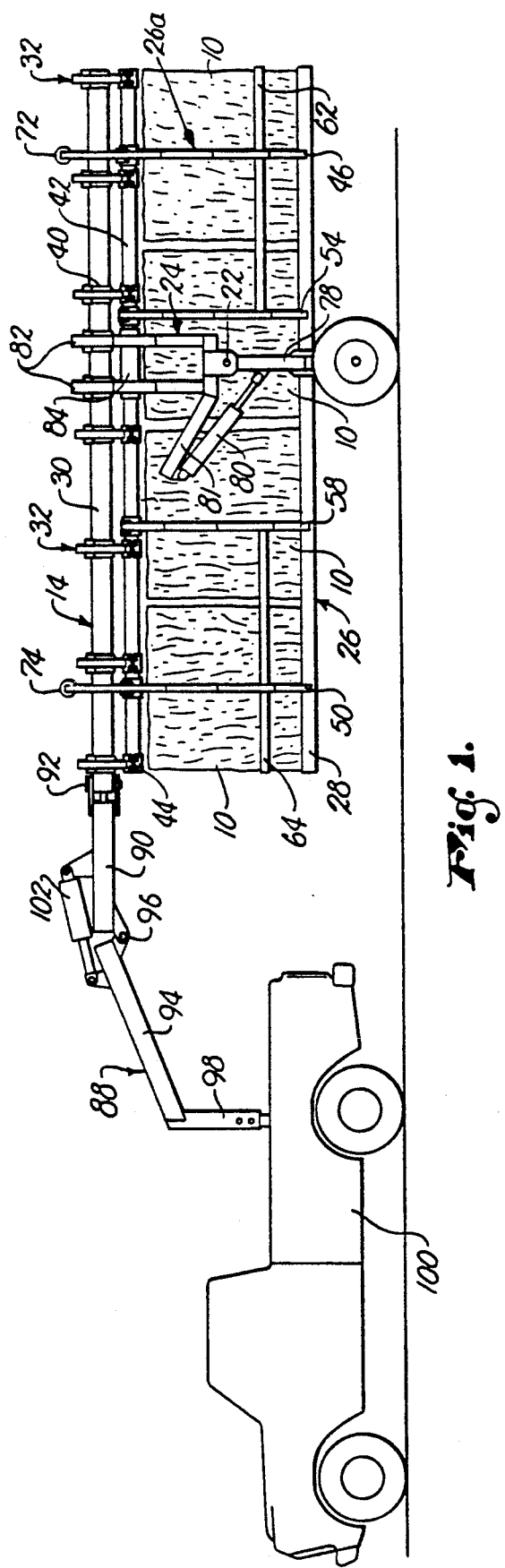

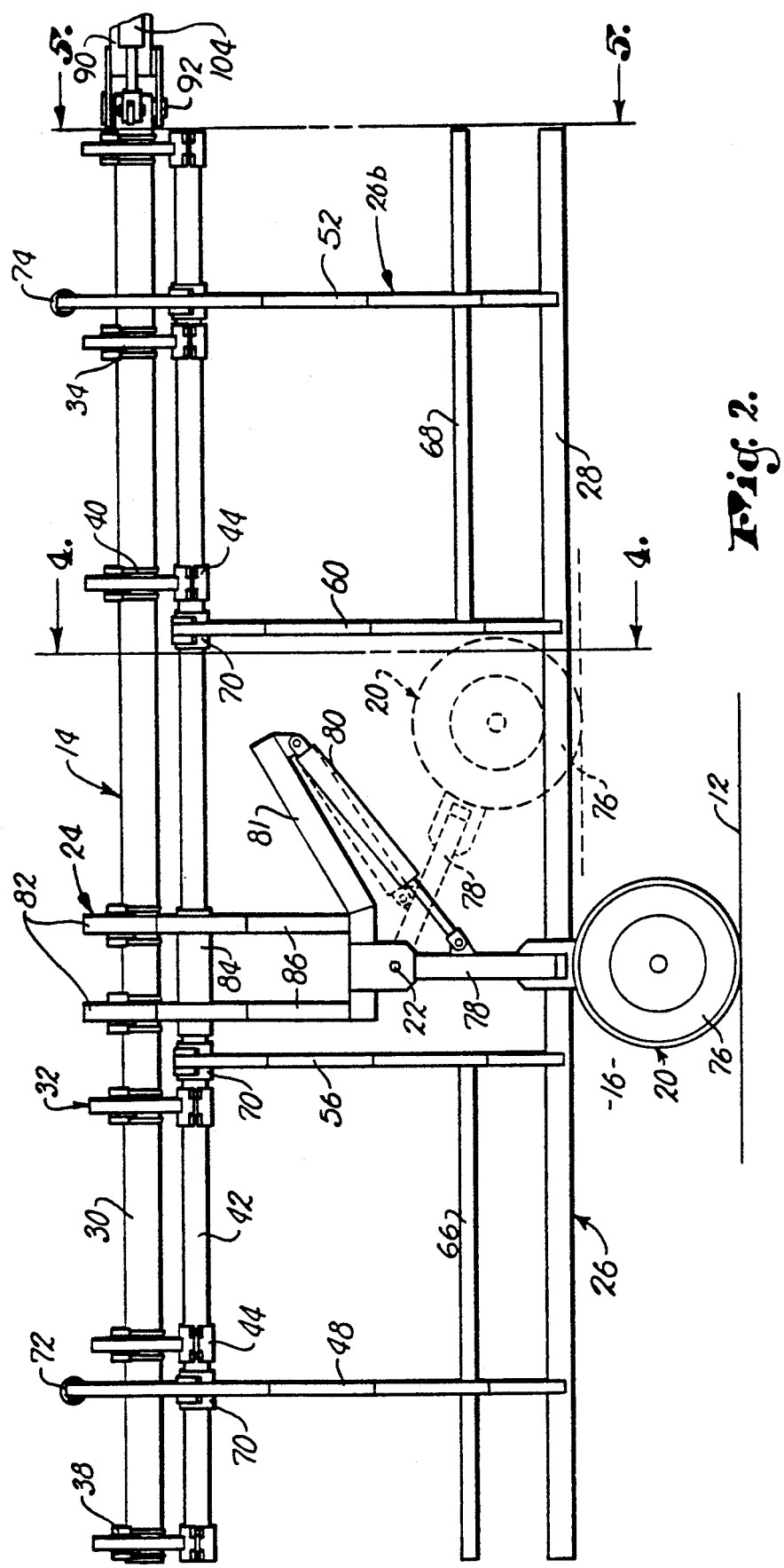

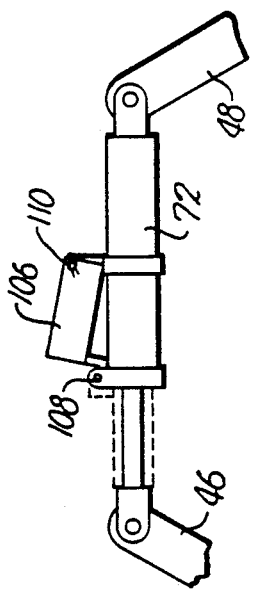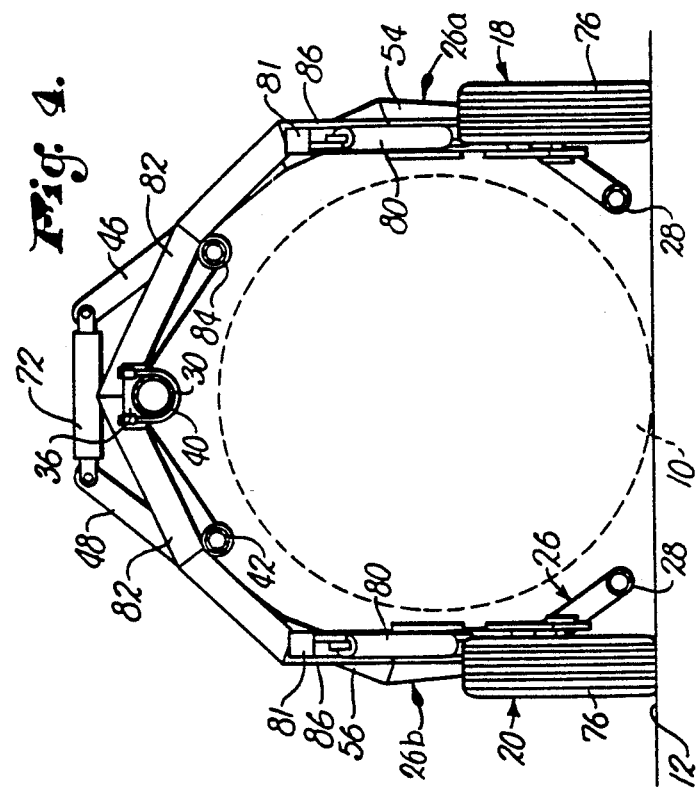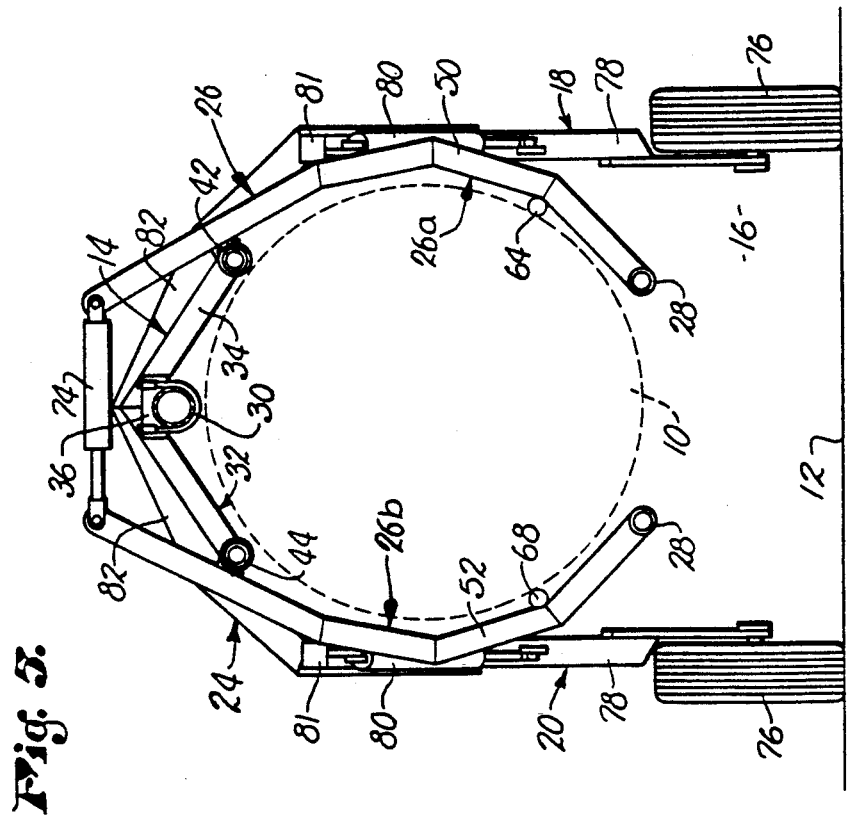

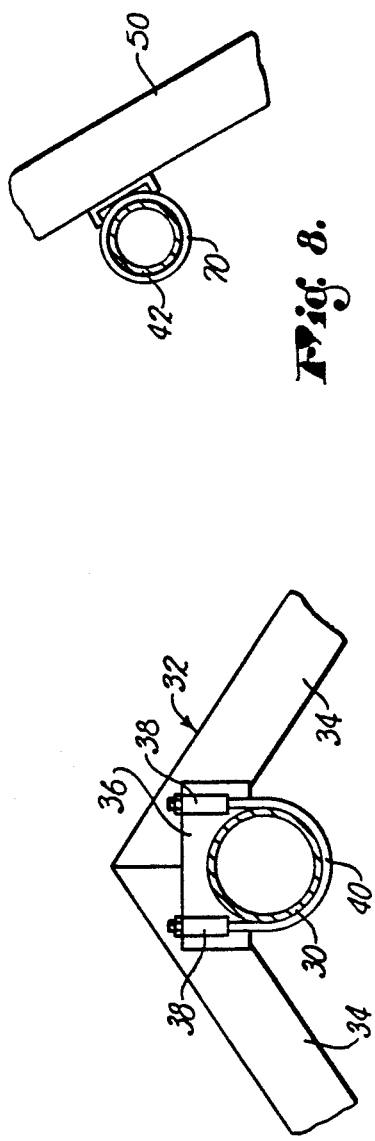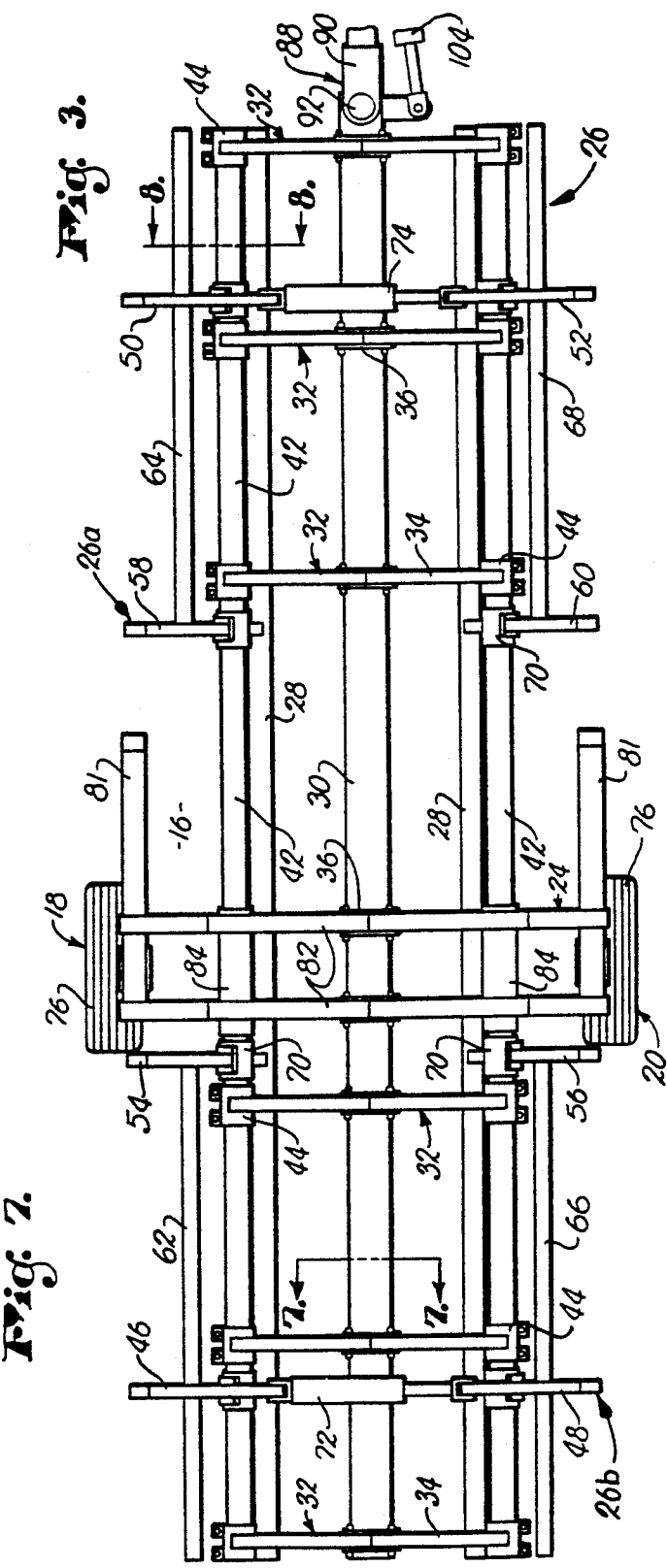

5,071,304

MULTI-BALE TRANSPORTING MACHINE FOR ROUND BALES

TECHNICAL FIELD

This invention relates to equipment for handling round bales and, more particularly, to a self-loading machine for transporting several of such bales at one time.

BACKGROUND

A number of self-loading machines have heretofore been suggested for simultaneously moving several round bales at a time. Some have utilized tilt beds in the nature of spaced rails having live conveyor chains along the top edges for conveying the bales upwardly and rearwardly as the beams or rails are driven downwardly under the bales lying in the field. Others have employed laterally spaced beams that are lowered horizontally to the ground and then jammed forwardly under each bale in succession before then being elevated to transport the bales to a point of discharge.

SUMMARY OF THE PRESENT INVENTION

On the other hand, the present invention relates to a machine having a pair of laterally spaced apart, fore-and-aft extending, opposed jaws that, when closed, form a generally cylindrical container that is open at both its front and rear ends and which is designed to accommodate and securely house a line or row of the bales for transport purposes. The two jaws when opened are spaced apart far enough that long, fore-and-aft beams along their lower extremities will avoid striking the end of a bale as the machine approaches the bale for pickup. Thus, the front end of the open container generally admits the awaiting bale as the machine is pulled forwardly, and once the bale is into position within the container so the machine straddles the bale, hydraulic cylinders are actuated to lower the entire machine down onto the bale in a pickup position. At this point the beams which were heretofore only situated on opposite sides of the bale now come into engagement with the ground, whereupon another set of hydraulic cylinders are actuated to close the jaws about the bale as the beams are moved transversely under the bale toward one another. Thereupon, the machine is raised and the bale is ready for transport to the next bale, whereupon the procedure is repeated.

BRIEF DESCRIPTION OF THE DRAWINGS

FIG. 1 is an elevational view showing a towing vehicle connected with a bale transporting machine made according to my present invention illustrating one side thereof supporting a line of end-to-end bales in elevated position, FIG. 2 is an elevational view on an enlarged scale showing the opposite side of the machine;

FIG. 3 is a top plan view thereof;

FIGS. 4 and 5 are cross-sectional views taken on lines 4—4 and 5—5 respectively of FIG. 2 with FIG. 4 showing the lowered position;

FIG. 6 is a fragmentary, detailed, side elevational view showing the piston and cylinder lock;

FIG. 7 is an enlarged fragmentary, cross-sectional view taken on line 7—7 of FIG. 3; and FIG. 8 is a fragmentary, detailed cross sectional view taken on line 8—8 of FIG. 3.

DETAILED DESCRIPTION

The farm implement shown in the drawings is adapted for handling large round bales 10 of harvested crops initially lying on their sides as deposited at random by the baler upon a field surface 12. Included is an elongated, top load-bearing truss frame 14 that is normally disposed with its longitudinal axis parallel to the normal path of travel of the implement. Such fore-and-aft axis of frame 14 is also coextensive in length with a plurality of bales 10 when arranged in end-to-end, abutting relationship.

The frame 14 is part of a mobile chassis and has pivots 22 on its opposite sides which connect inverted U-shaped structure 24 of the frame with ground wheel assemblies 18 and 20.

An elongated, generally cylindrical bale-handling container 26, open at its front and rear ends, depends from and extends longitudinally of the frame 14 below the same. Among other things, the container 26 includes a pair of elongated, transversely spaced, bale-supporting beams 28 coextensive in length and parallel with the frame 14, shown in two positions in FIGS. 4 and 5.

The frame 14 includes an elongated, uppermost ridge pole 30 having a number of trusses 32 spaced there along, each including a pair of struts 34 connected by a pair of cross plates 36 having a pair of upright tubes 38. The struts 34 diverge downwardly from the pole 30 and the latter is suspended from the plates 36 at and below the apexes of the struts 34 by a pair of U-bolts 40 carried by the tubes 38. A pair of elongated, horizontally spaced, lowermost ties 42 interconnect corresponding struts 34 in parallelism with the pole 30, there being a clamp 44 on the lower end of each strut 34 for attaching the ties 42 to the trusses 32.

The container 26 is constructed to present left and right, transversely spaced, elongated jaws 26a and 26b on opposite sides of the central axis of the machine. A pair of powered arms 46 and 48 at the trailing end of the implement, a pair of powered arms 50 and 52 at the leading end of the implement, a pair of intermediate arms 54 and 56 adjacent the rear of the framework 24 and a pair of intermediate arms 58 and 60 spaced forwardly of the framework 24, all of outwardly bowed configuration, and all rigidly joined at their lower ends to the corresponding beam 28, give the jaws 26a and 26b a generally concave shape. The arms 46 and 54 are joined by an auxiliary beam 62 and the arms 50 and 58 are joined by an auxiliary beam 64. An auxiliary beam 66 joins the arms 48 and 56 and an auxiliary beam 68 joins the arms 52 and 60.

The arms 46–60 are provided with sleeves 70 rotatable on the ties 42, and the arms 46–52 extend upwardly beyond the ties 42. A transverse hydraulic piston and cylinder assembly 72 pivotally interconnects the arms 46 and 48 above the frame 14 and a similar assembly 74 is provided between the arms 50 and 52.

Each of the ground wheel assemblies 18,20 includes a ground wheel 76 rotatably carried by a standard 78 that is, in turn, swingable about its pivot 22. Each standard 78 is actuated by a hydraulic piston and cylinder mechanism 80 pivotally connected with an upward and forwardly projecting extension 81 on the structure 24.

The structure 24 is in the form of a pair of spaced, U-shaped frame units 82 connected with the pole 30 in the same manner as the trusses 32 and with the ties 42 by tubes 84 thereon which join the frame units 82. Side portions 86 of the frame units 82 depend vertically from the bights thereof as seen in FIG. 4.

A tongue 88 has a horizontal section 90 connected with the pole 30 by an upright pivot pin 92, an inclined section 94 connected with the section 90 by a transverse pivot pin 96 and an upright section 98 rigid to the section 94 and carried by a ball joint or the like (not shown) on the bed of a truck 100. By a cross pin connection through a selected one of a series of holes in one of the telescoped parts of the section 98, it is adapted for connection at a lower height to the drawbar of a tractor. A hydraulic piston and cylinder assembly 102 controls the angle between the sections 90 and 94, and a similar assembly 104 controls the angle between the pole 30 and the section 90.

In FIG. 6 of the drawings there is shown a lock for releasably holding the piston rod of the assembly 72 for the arms 46,48 in its extended position. It includes a channel member 106 having a pivotal connection 108 with a clamp on the cylinder of the assembly and a releasable connection, as by a pin 110, on a second clamp on the assembly 72. After release of the pin 118, the channel 106 may be swung to the dotted line position shown in FIG. 6 to preclude piston retraction. Any or all of the additional assemblies 74, 80—80, 102, 104 may also be provided with similar locks as desired or needed.

Operation

The implement is normally pulled to and from the field directly behind the towing vehicle 100 to provide for minimum road width and gate clearance. As a first bale 20 is approached, the assembly 104 is actuated to offset the line of travel of the implement relative to that of the vehicle 100, the assemblies 72 and 74 being retracted to spread the beams 28,28 apart.

The implement is advanced so that the first bale "enters" the open front end of the container 26 with its widespread jaws 26a,26b, whereupon the machine is stopped. The assemblies 80 are then retracted (FIG. 2) to lower the beams 28 to the ground (FIG. 4). The assemblies 72,74 are then extended to swing the jaws 26a,26b toward one another which forces the beams 28 in under the bale in a generally horizontal motion. The assemblies 80 are then extended to raise the first bale 10, supported from beneath by beams 28 and firmly clamped from the sides by the remaining portions of the jaws 26a,26b (FIG. 5).

The implement is then advanced to bring the forward end of the raised bale 10 into abutting relation to one end of a second bale 10 lying on the ground 12, at which time the assemblies 80 are once again retracted to lower the first bale 10 to the ground 12. The assemblies 72,74 are thereupon retracted to spread the jaws 26a,26b away from the first bale 10. This step is followed by implement advancement, closing of jaws 26a,26b and raising of the frame and container until both the first and second bales are lifted off the ground 12.

These series of steps are continued successively until an entire line of bales 10, extending from front to rear of the implement in abutting relationship, are loaded and ready for transport as seen in FIG. 1. The locking channels 106 of assemblies 72,74,80 may then be swung to the dotted line position shown in FIG. 6 as a safety measure or to avoid the need for maintaining hydraulic pressure in those assemblies during transport to the stack yard.

Off-loading requires simply the lowering of the series of bales 10 to the ground 12, spreading of the jaws 26a,26b and advancement or reversal of the implement, leaving the bales 10 stored in a neat, continuous row on the ground in end-to-end abutment.

In the event there are bales 10 lying in the field so as to not be readily accessible at the front end of the implement, as along fences or adjacent other obstacles, the implement may simply be backed into straddling relationship to such bales, followed by the same loading steps as above outlined.

I claim:

1. In a multiple round bale transporting machine, the improvement comprising:

a mobile chassis having a tongue adjacent the normally forward end thereof and adapted for attachment to a towing vehicle, said chassis including a fore-and-aft, overhead truss frame above a bale transporting area of the machine and having an elongated, uppermost, central ridge pole, a number of transverse trusses spaced along the pole, each provided with a pair of struts connected to and diverging from the pole, and a pair of elongated, transversely spaced, lowermost, fore-and-aft ties interconnecting the struts in parallelism with the pole, said struts terminating at their lower ends at said ties;

a pair of transversely spaced leg structures, each of the pair of leg structures fixed to and depending from opposite sides of the truss frame at a point generally midway between opposite fore-and-aft ends of the truss frame, said leg structures having ground wheels at lower ends thereof and power mechanism operably coupled with the wheels for selectively raising and lowering the truss frame relative to the wheels whereby the truss frame is raised and lowered relative to the ground;

an elongated, fore-and-aft, transporting container open at its front and rear ends and carried by and suspended below the truss frame between the leg structures for receiving and supporting for over-the-ground travel a line of round bales arranged end-to-end, said container including a pair of elongated, fore-and-aft extending, laterally spaced apart, and generally transversely concave jaws, said jaws being pivotally mounted on opposite ones of said ties for transverse swinging movement toward and away from one another about the longitudinal axes of the ties between a wide-spread, open position in which the jaws are spaced from the line of bales and a more closely spaced, closed position in which the jaws are clamped around the bales, each of said jaws having an elongated, fore-and-aft beam at its lower end extending the full length of the transporting container and adapted to be forced underneath the line of bales into supporting relationship therewith when the jaws are moved to their closed position, said power mechanism being operable to control the vertical position of the truss frame in such a manner that the container is raised and lowered between a lowered position in which the beams of the jaws are closely adjacent the ground for insertion under the line of bales and a raised position in which the beams are spaced above the ground for carrying the line of bales during transport; and power means operably coupled with said jaws for effecting said movement thereof toward and away from one another, said tongue being coupled with the truss frame and including means for positioning the container in laterally offset relation to the towing vehicle for front loading of the container.

2. In a round bale transporting machine as claimed in claim 1, said means for positioning the container in laterally offset relationship to the towing vehicle including fluid pressure means for causing relative swinging between the tongue and the container.

3. In a round bale transporting machine as claimed in claim 1, said tongue including a pair of sections hingedly interconnected about a transverse horizontal axis for vertical swinging movement of one of the sections and the container relative to the other section for adjusting the fore-and-aft angular relationship of the container with the ground.

4. In a round bale transporting machine as claimed in claim 1, each of said jaws including a plurality of fore-and-aft spaced, transversely outwardly bowed arms pivotally secured at their upper ends to respective ties of the frame and fixedly secured at their lower ends to respective ones of the beams.

* * * * *